(12) United States Patent
Halderman et al.

(10) Patent No.: US 11,136,266 B2
(45) Date of Patent: Oct. 5, 2021

(54) THIXOTROPIC NON-CEMENTITIOUS THERMAL GROUT AND HDD OR TROUGH PRODUCT LINE METHODS OF APPLICATION

(71) Applicant: Quanta Associates, L.P., Houston, TX (US)

(72) Inventors: Ronald G. Halderman, Billings, MT (US); Pablo Esteban Guerra, Yorkville, IL (US)

(73) Assignee: Quanta Associates, L.P., Houston, TX (US)

( * ) Notice: Subject to any disclaimer, the term of this patent is extended or adjusted under 35 U.S.C. 154(b) by 0 days.

(21) Appl. No.: 16/935,665

(22) Filed: Jul. 22, 2020

(65) Prior Publication Data

US 2020/0346980 A1    Nov. 5, 2020

Related U.S. Application Data

(63) Continuation-in-part of application No. 16/682,952, filed on Nov. 13, 2019, now Pat. No. 11,095,101, and a continuation-in-part of application No. 16/330,891, filed as application No. PCT/US2017/050219 on Sep. 6, 2017, now Pat. No. 10,914,121.

(Continued)

(51) Int. Cl.
| | |
|---|---|
| *C04B 28/00* | (2006.01) |
| *C04B 14/10* | (2006.01) |
| *C09K 8/14* | (2006.01) |
| *C04B 22/00* | (2006.01) |
| *C04B 111/10* | (2006.01) |

(Continued)

(52) U.S. Cl.
CPC ............ *C04B 28/00* (2013.01); *C04B 14/104* (2013.01); *C04B 22/002* (2013.01); *C09K 8/14* (2013.01); *C04B 2111/0012* (2013.01); *C04B 2111/1037* (2013.01); *C04B 2111/70* (2013.01)

(58) Field of Classification Search
CPC ....... C04B 28/00; C04B 14/104; C04B 22/00; C09K 3/032; C09K 3/04; C09K 3/14; C09K 3/62; C09K 8/032; C09K 8/04; C09K 8/14; C09K 8/62
See application file for complete search history.

(56) References Cited

U.S. PATENT DOCUMENTS

| | | | |
|---|---|---|---|
| 5,241,993 A | 9/1993 | Stephens | |
| 6,655,475 B1 * | 12/2003 | Wald | ....................... E21B 21/00 166/117 |

(Continued)

OTHER PUBLICATIONS

Copenheaver, Blaine R., International Search Report for PCT/US2020/043069, dated Oct. 14, 2020, 2 pages, ISA/US, Alexandria, Virginia.

(Continued)

*Primary Examiner* — Frederick L Lagman
(74) *Attorney, Agent, or Firm* — Oathout Law Firm; Mark A. Oathout

(57) ABSTRACT

The disclosure relates to embodiments of a thixotropic, non-cementitious, thermal grout and applications or methods of use of the grout related to horizontal directional drilling, trenchless technology, trenching, and installation of pipe, conduits, ducts, utility lines, and other product lines which may, e.g., be in trenches, underground, or under obstacles, such as a body of water or roadways.

38 Claims, 4 Drawing Sheets

Related U.S. Application Data

(60) Provisional application No. 62/384,097, filed on Sep. 6, 2016, provisional application No. 62/887,467, filed on Aug. 15, 2019, provisional application No. 62/877,120, filed on Jul. 22, 2019.

(51) Int. Cl.
  *C04B 111/00*     (2006.01)
  *C04B 111/70*     (2006.01)

(56) References Cited

U.S. PATENT DOCUMENTS

| | | |
|---|---|---|
| 2012/0247766 A1 | 10/2012 | Hemmings |
| 2015/0197033 A1 | 7/2015 | Agapiou et al. |
| 2016/0002521 A1* | 1/2016 | Dillon .................. C10M 159/02 |
| | | 507/101 |
| 2019/0211628 A1* | 7/2019 | Halderman ............... E21B 7/20 |
| 2020/0099202 A1* | 3/2020 | Hastings .................. H02G 3/04 |

OTHER PUBLICATIONS

Copenheaver, Blaine R., Written Opinion of the International Searching Authority for PCT/US2020/043069, dated Oct. 14, 2020, 7 pages, ISA/US, Alexandria, Virginia.

Mi SWACO a Schlumberger Company, DRILPLEX, 2 pages, 2004, miswaco.com, Houston, Texas.

* cited by examiner

THIXOTROPIC NON-CEMENTITIOUS THERMAL GROUT AND HDD OR TROUGH PRODUCT LINE METHODS OF APPLICATION

TECHNICAL FIELD

The disclosure relates to the field of horizontal directional drilling, trenchless technology, trenches, and grouts for installation of pipe, conduits, ducts, utility lines, and other product lines underground or under obstacles, such as a body of water or roadways.

BACKGROUND

Installation of electrical lines or underground cables has traditionally involved pumping a concrete mix into the annular space around electrical lines or underground cables. The process is time sensitive because the concrete will set. For example, such concrete mixtures may set in about twelve (12) hours or less. Additionally, the concrete has air pockets or voids such that fill rates or percentages may typically be 50-60%, or even as low as 40%.

The standard or traditional cementitious grouts, e.g. those comprising Portland cement, do not flow well, have high or higher temperatures due to heat of hydration which may deform, e.g., a duct or other apparatus, and become solid after (and maybe even during) their installation. Further, these traditional cementitious grouts irreversibly "set" after a period of time, and may put impractical or impossible time constraints on installation projects. Moreover, the voids and air pockets of the traditional cementitious grouts are undesirable and detrimental to cables.

BRIEF SUMMARY

The present disclosure generally relates to embodiments of a thixotropic, non-cementitious, thermal grout and applications or methods of use of the grout related to horizontal directional drilling, trenchless technology, trenching, and installation of pipe, conduits, ducts, utility lines, and other product lines which may, e.g., be in trenches, underground, or under obstacles, such as a body of water or roadways.

The present disclosure relates to embodiments of a thixotropic non-cementitious thermal grout for horizontal directional drilling ("HDD") applications for use with cables/conduits/ducts/product lines.

Additionally, the present disclosure relates to embodiments of a thixotropic non-cementitious thermal grout for trenching applications for use with cables/conduits/ducts/product lines.

Additionally, the present disclosure relates to embodiments of methods of installing cables/conduits/ducts/product lines related to horizontal directional drilling, trenchless technology, and trenching.

Horizontal directional drilling (also referred to as "HDD") is a sophisticated, trenchless technique/method used to install utilities, such as natural gas pipe lines, electric and many other infrastructural needs, including by way of example only pipe, conduit, or cable, under ground level and often under obstacles.

As used herein the term "product line(s)" shall refer to a conduit(s), pipe(s), tubular(s), duct(s), casing(s), cable(s) and/or the like. As used herein those terms do not refer to oil and gas drilling and production. As used herein the term "frac" shall also refer to fracking or hydraulic fracturing.

BRIEF DESCRIPTION OF DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF EXEMPLARY EMBODIMENTS

Figure 1:
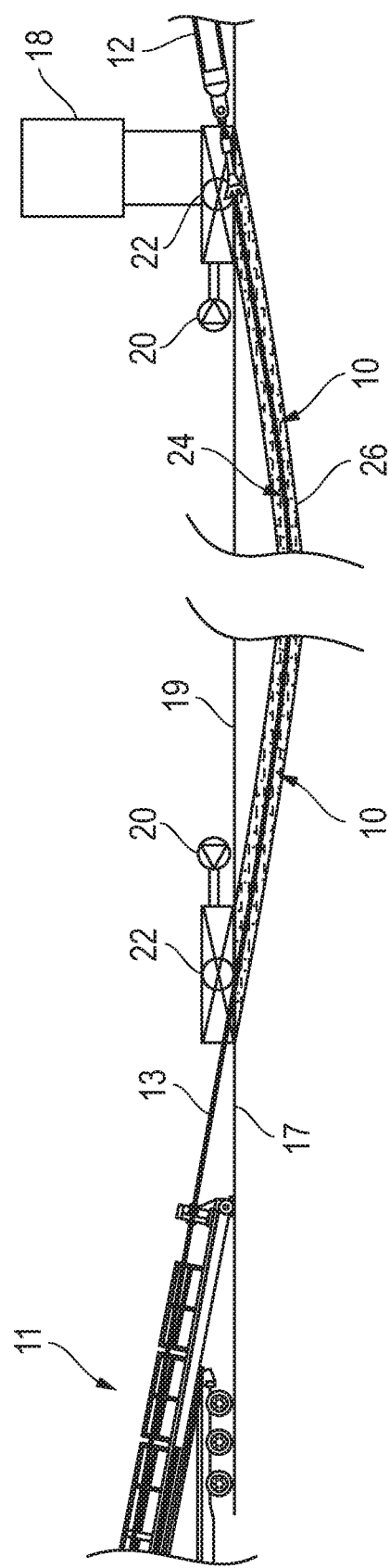
FIG. 1 depicts a sectional schematic view of an exemplary embodiment of a metal casing and metal line pipes containing cable during an installation or pull-back (or removal for maintenance) at or near a midpoint position with a thixotropic non-cementitious thermal grout filling a space or void.

The description that follows includes exemplary apparatus, methods, techniques, and instruction sequences that embody techniques of the inventive subject matter. However, it is understood that the described embodiments may be practiced without these specific details.

A thixotropic non-cementitious thermal grout for HDD application for use with cables/conduits/ducts/product lines or a thixotropic non-cementitious thermal grout for trenching applications for use with cables/conduits/ducts/product lines may have a very low viscosity and flow freely while being pumped or when energy is being applied, have no heat of hydration, gel quickly or rest in a hardened state, after pumping stops or energy is removed/no longer added, and can return to low viscosity or be "re-liquefied" or "un-gelled" later by reapplying energy to allow removing, e.g., a duct in a casing, and/or a cable in a duct. Due to the non-cementitious or non-setting nature of the thixotropic non-cementitious thermal grout, it is possible to remove ducts/pipes, etc. in the future, e.g., for maintenance, or if there is a problem with the system. As a gel the thixotropic non-cementitious thermal grout resists flowing or seeping through cracks in pipe, casing or duct.

Such a thixotropic non-cementitious thermal grout may have a thermal resistivity about equal to or less than 75° C.-cm/W wherein the thermal resistivity does not change or does not significantly change with time. As one example, the thermal resistivity may be about 63° C.-cm/W. As another example, the thermal resistivity may be about 65° C.-cm/W. Preferably, a thixotropic non-cementitious thermal grout has a thermal resistivity which matches or substantially matches the thermal resistivity of the native soils of a project site. For example, native soils of a project site can often vary from 65 to 75° C.-cm/W. Therefore, a formulation or mix of a thixotropic non-cementitious thermal grout depends upon the thermal resistivity of the native soils of a project site.

Additionally, a thixotropic non-cementitious thermal grout may have an electrical conductivity that can provide or facilitate cathodic protection of a cable pipe inside a steel casing. A thixotropic non-cementitious thermal grout may have a relatively high pH (about or approximately pH 11 or higher, preferably about pH 11-12), which is preferable in mitigating corrosion or facilitating cathodic protection of steel pipelines/conduits/ducts/product lines. In the "gelled" or solid state, the thixotropic non-cementitious thermal grout may not seep through a crack in the structure where the grout is located. A thixotropic non-cementitious thermal grout may not dry-out, i.e. it may always remain fully saturated or substantially saturated. Further, a thixotropic non-cementitious thermal grout may be used in or approved for use in environmentally sensitive areas. The density of a thixotropic non-cementitious thermal grout generally depends upon sand content and, by way of example only, may preferably be about 97 pounds per cubic foot—i.e. specific gravity of about 1.6. By way of example only, the density of a thixotropic non-cementitious thermal grout may be about 99 pounds per cubic foot.

A thixotropic non-setting or non-cementitious thermal grout provides improvements or advantages for cable installation and ampacity. By way of example only, there may be about an 8-10% increase in ampacity rating if a thixotropic non-cementitious thermal grout is added to a duct in a trenched installation. As another example, there may be about a 4-6% increase in ampacity rating if a thixotropic non-cementitious thermal grout is added for an HDD installation. Even higher percentage increases to ampacity rating, whether, e.g., a trenched installation or a HDD installation, may occur when cables/conduits/ducts/product lines are shorter lengths or distances. A high-density thixotropic non-cementitious thermal grout may prevent long-term duct deformation due to external hydrostatic pressure in a deep HDD. Additionally, the grout may be injected into existing ducts—either transmission or distribution—to obtain rating increases or increment in lifetime expectancy of electric systems.

A thixotropic non-cementitious thermal grout may aid the installation of ducts in a casing.

A thixotropic non-cementitious thermal grout may also have applications in transmission and distribution cable systems. For example, in an HDD with a casing, filling the volume or annular space or void between ducts or pipe and the casing will improve heat transfer, increasing cable rating. As an additional example, filling cable ducts with the grout before cable installation provides buoyancy and permits longer pulls.

Figure 2:
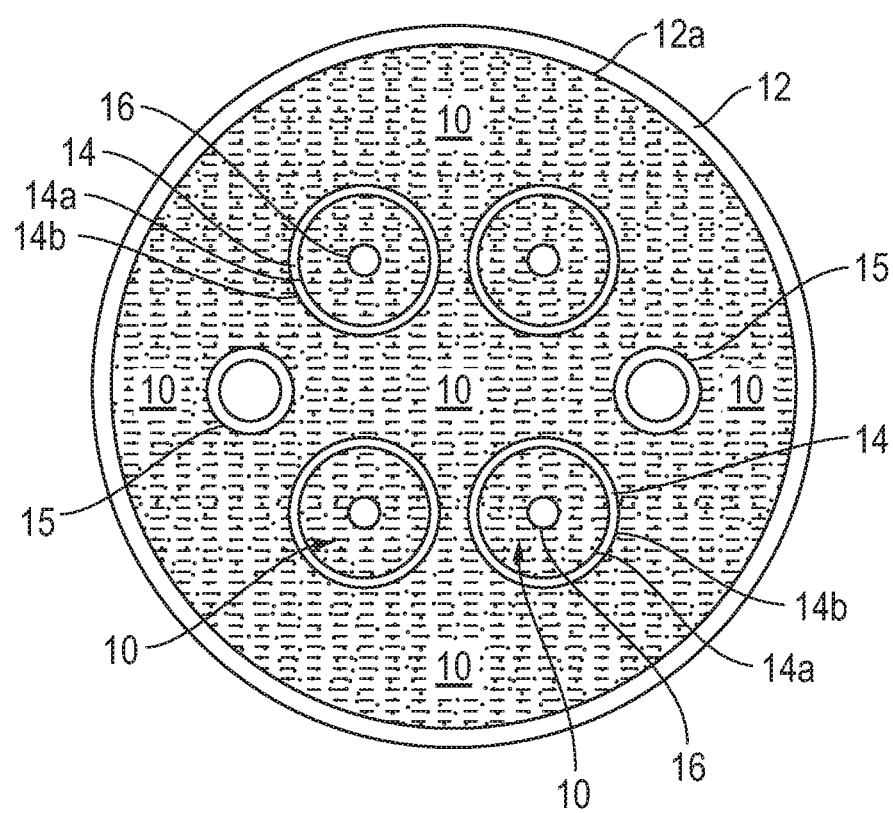
FIG. 2 shows a schematic, sectional view of an exemplary embodiment of a thixotropic non-cementitious thermal grout occupying a space or void between a steel casing and steel line pipes/steel cable pipes containing cable.

FIGS. 1-2 show a sectional schematic view of an exemplary embodiment of an HDD rig or apparatus 11 on surface 17 pulling pipe 13 connected to a metal casing 12 and metal line pipes 14 containing cable 16 during an installation or pull-back (or removal for maintenance) under an obstacle 19 utilizing a thixotropic non-cementitious thermal grout 10 filling a space or void 24 defined by drilled or reamed walls 26. The exemplary embodiment of FIG. 1 also shows frac tank 18, vacuum pump(s) 20, and ball valve(s) 22 which may be utilized as a part of the installation or pull-back process.

FIG. 2 shows a schematic, sectional view of an exemplary embodiment (not drawn to scale) of a volume of thixotropic non-cementitious thermal grout 10 occupying or filling the annular space or void between the inner surface 12a of metal, e.g. steel, casing 12 and the outer surface 14b of metal, e.g., steel, line pipes/steel cable pipes 14, the steel line pipes/steel cable pipes 14 containing cable 16. Grout 10 may additionally and/or optionally occupy the annular space or void between the inner surface 14a of steel line pipe or duct 14 and cable 16. In this figure, the volume of thixotropic non-cementitious thermal grout 10 is indicated by symbols/hatching.

Figure 3:
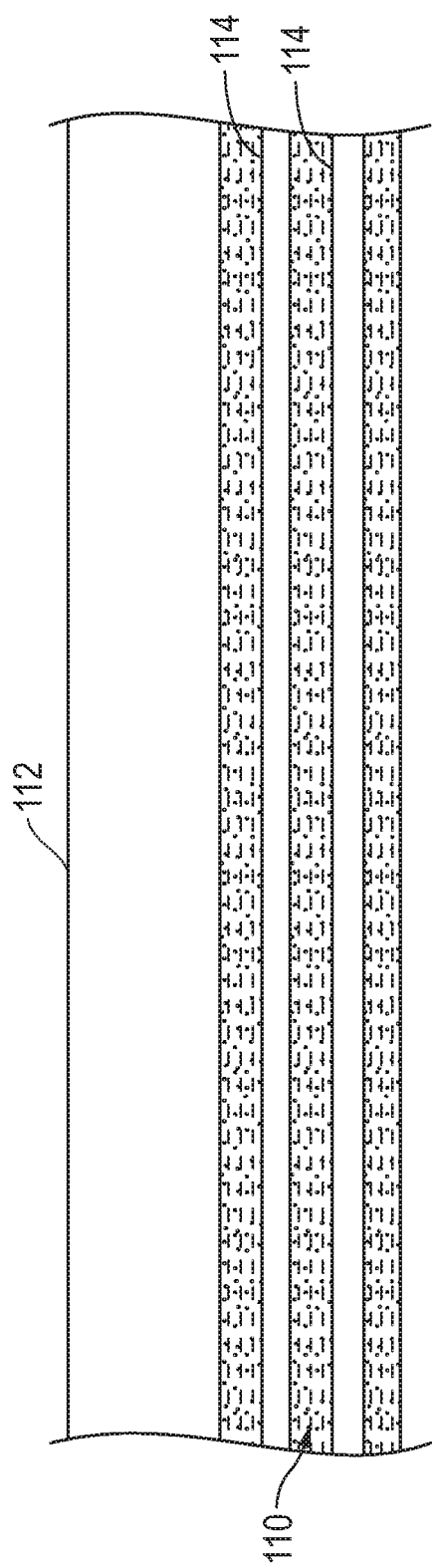
FIG. 3 depicts a sectional schematic view of an exemplary embodiment of a trough containing cable during an install (or removal for maintenance) at or near a midpoint position with a thixotropic non-cementitious thermal grout filling a space or void.

FIG. 3 shows a sectional schematic view of an exemplary embodiment of a trough 112 containing conduit 114 containing cable during an install (or removal for maintenance) with a thixotropic non-cementitious thermal grout 110 filling a space or void.

Figure 4:
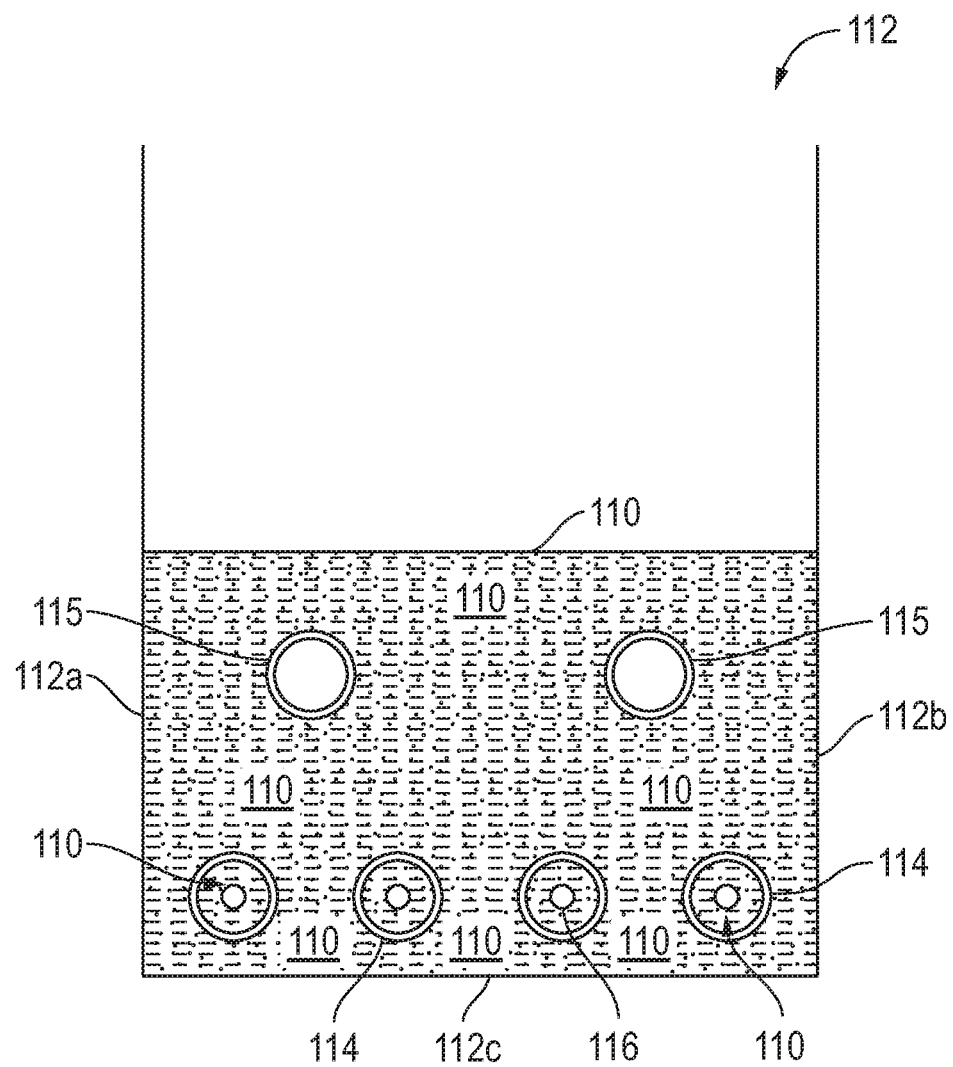
FIG. 4 shows a schematic, sectional view of an exemplary embodiment of a thixotropic non-cementitious thermal grout occupying a space or voice between cables/conduits/product lines and walls of a trench.

FIG. 4 shows a schematic, sectional view of an exemplary embodiment (not drawn to scale) of a volume of thixotropic non-cementitious thermal grout 110 occupying or filling a space or void between cables/conduits/ducts/product lines 114 and the walls 112a, 112b, 112c of a trench 112. Grout may additionally and/or optionally occupy the annular space or void between conduit 114 and cable 116. Referring to FIG. 3, in this embodiment, the thixotropic non-cementitious thermal grout 110 is not filling the entire trench 112. In this figure, the volume of thixotropic non-cementitious thermal grout 110 is indicated by symbols/hatching.

Empty conduits 15, 115 are represented in FIGS. 2 and 4. The empty conduits 15, 115 could commonly be used for fiber optics installation (fiber optics used for data transmission). Alternatively, the empty conduits 15, 115 could have another use as spare conduit(s) in case of the failure of the primary conduit(s). If used to replace a primary conduit due to a system failure conduit(s) 15 and/or 115 can be filled with thixotropic non-cementitious thermal grout 10 and/or 110 at the moment or time of installing a cable therethrough.

In one exemplary embodiment, a thixotropic non-cementitious thermal grout for HDD applications for use with cables/conduits/ducts/product lines may comprise a volume of sand, a volume of water, a volume of bentonite viscosifier, a volume of at least one bentonite extender, a volume of lubricant, and a volume of soda ash.

In one exemplary embodiment, a thixotropic non-cementitious thermal grout 10 for HDD applications, as in FIG. 2, for use with cables/conduits/ducts/product lines 12, 14, 16 may comprise a volume of frac sand at about 1629 lb/yd$^3$, a volume of water at about 982 lb/yd$^3$, a volume of bentonite viscosifier at about 43.5 lb/yd$^3$, a volume of at least one bentonite extender at about 10.3 lb/yd$^3$, a volume of lubricant at about 4.0 lb/yd$^3$, and a volume of soda ash at about 7.6 lb/yd$^3$.

In one exemplary embodiment, a thixotropic non-cementitious thermal grout for HDD applications for use with cables/conduits/ducts/product lines may have a thermal resistivity of about equal to or less than 75° C.-cm/W.

In one exemplary embodiment, a thixotropic non-cementitious thermal grout for HDD applications for use with cables/conduits/ducts/product lines may have a pH of at least about 11.

In one exemplary embodiment, a thixotropic non-cementitious thermal grout for HDD applications for use with cables/conduits/ducts/product lines may have a pH in the range of about 11-12.

In one exemplary embodiment, a thixotropic non-cementitious thermal grout for HDD applications for use with cables/conduits/ducts/product lines may further comprise a second bentonite extender. By way of example only, the second bentonite extender may further comprise a mixed metal oxide.

In one exemplary embodiment of a thixotropic non-cementitious thermal grout for HDD applications for use with cables/conduits/ducts/product lines, the volume of sand may be a flaked frac sand.

In one exemplary embodiment of a thixotropic non-cementitious thermal grout for HDD applications for use with cables/conduits/ducts/product lines, the frac sand may be #100 frac sand (e.g., but not limited to, white). Such a frac sand is commercially available from Erna Frac Sand, and US Silica.

In one exemplary embodiment of a thixotropic non-cementitious thermal grout for HDD applications for use with cables/conduits/ducts/product lines, the volume of bentonite viscosifier may be MAX-GEL. MAX-GEL, brand/trademark of M-I L.L.C., is an off-the-shelf bentonite viscosifier commercially available from M-I SWACO, a Schlumberger Company. Generically MAX-GEL may be a viscosifier and namely a premium 220-bbl yield Wyoming bentonite blended with special extender. The viscosifier is capable of yielding more than twice as much viscosity as regular Wyoming bentonite.

In one exemplary embodiment of a thixotropic non-cementitious thermal grout for HDD applications for use with cables/conduits/ducts/product lines, the volume of at least one bentonite extender may be DRILPLEX. DRILPLEX, brand/trademark of M-I L.L.C., is an off-the-shelf bentonite extender commercially available from M-I SWACO, a Schlumberger Company. Generically DRILPLEX may be a bentonite extender and secondary shale stabilizer designed to give improved carrying capacity and suspending ability in water-base drilling fluids, and/or a mixed metal oxide (MMO) or contains same.

In one exemplary embodiment of a thixotropic non-cementitious thermal for HDD applications for use with cables/conduits/ducts/product lines, the volume of lubricant is RODEASE. RODEASE, brand/trademark of M-I L.L.C., is an off-the-shelf lubricant commercially available from M-I SWACO, a Schlumberger Company.

In one exemplary embodiment, a thixotropic non-cementitious thermal grout 110 for trenching applications, as in FIG. 4, for use with cables/conduits/ducts/product lines 114, 116 may comprise a volume of sand, a volume of water, a volume of bentonite viscosifier, a volume of at least one bentonite extender, a volume of lubricant, and a volume of soda ash. Generically RODEASE may be a lubricant.

In one exemplary embodiment, a thixotropic non-cementitious thermal grout for trenching applications for use with cables/conduits/ducts/product lines may comprise a volume of frac sand at about 1629 lb/yd$^3$, a volume of water at about 982 lb/yd$^3$, a volume of bentonite viscosifier at about 43.5 lb/yd$^3$, a volume of at least one bentonite extender at about 10.3 lb/yd$^3$, a volume of lubricant at about 4.0 lb/yd$^3$, and a volume of soda ash at about 7.6 lb/yd$^3$.

In one exemplary embodiment, a thixotropic non-cementitious thermal grout for trenching applications for use with cables/conduits/ducts/product lines may have a thermal resistivity of about 63° C.-cm/W.

In one exemplary embodiment, a thixotropic non-cementitious thermal grout for trenching applications for use with cables/conduits/ducts/product lines may have a pH of at least about 11.

In one exemplary embodiment, a thixotropic non-cementitious thermal grout for trenching applications for use with cables/conduits/ducts/product lines may have a pH in the range of about 11-12.

In one exemplary embodiment, a thixotropic non-cementitious thermal grout for trenching applications for use with cables/conduits/ducts/product lines may further comprise a second bentonite extender. In one exemplary embodiment, the second bentonite extender may further comprise a mixed metal oxide.

In one exemplary embodiment of a thixotropic non-cementitious thermal grout for trenching applications for use with cables/conduits/ducts/product lines, the volume of sand may be a flaked frac sand.

In one exemplary embodiment of a thixotropic non-cementitious thermal grout for trenching applications for use with cables/conduits/ducts/product lines, the frac sand may be #100 frac sand (e.g., but not limited to, white).

In one exemplary embodiment of a thixotropic non-cementitious thermal grout for trenching applications for use with cables/conduits/ducts/product lines, the volume of bentonite viscosifier may be MAX-GEL. MAX-GEL, brand/trademark of M-I L.L.C., is an off-the-shelf bentonite viscosifier commercially available from M-I SWACO, a Schlumberger Company.

In one exemplary embodiment of a thixotropic non-cementitious thermal grout for trenching applications for use with cables/conduits/ducts/product lines, the volume of at least one bentonite extender may be DRILPLEX. DRILPLEX, brand/trademark of M-I L.L.C., is an off-the-shelf bentonite extender commercially available from M-I SWACO, a Schlumberger Company.

In one exemplary embodiment of a thixotropic non-cementitious thermal grout for trenching applications for use with cables/conduits/ducts/product lines, the volume of lubricant is RODEASE. RODEASE, brand/trademark of M-I L.L.C., is an off-the-shelf lubricant commercially available from M-I SWACO, a Schlumberger Company.

Related to horizontal directional drilling, trenchless technology, and trenching, one exemplary embodiment of a method of installing cables/conduits/ducts/product lines comprises the steps of filling a void or space with a thixotropic non-cementitious thermal grout, and pulling a product line through the grout. The steps of filling and pulling may occur in any sequence, order, and/or at the same time/simultaneously (in other words the thixotropic non-cementitious thermal grouting may occur in new installations after drilling before product line is moved in, or by filling as one goes along with the product line; or product line can be moved in/out of existing installations, e.g. even installations many months or years old as the grout 10/110 continues to flow freely long after it is first installed). Further, the grout may have a greater than 80% fill rate or percentage, and preferably 99% or higher fill rate or percentage, or wherein greater than 80% of the desired space or void to be filled contains grout (as opposed to undesirable air pockets or voids or spaces in the grout). A void or space to be filled may be, by way of example only, an annular space or void, or a trench or a portion of a trench, or the space or void of a conduit, duct, casing, or product line. By way of example only, it is preferred, for example, that there is minimal air trap or minimal large pockets of air localized within, e.g. the entire conduit after grouting work is completed. This has the advantages of improving heat dissipation or thermal conductivity from cable to the earth and improving electrical conductivity. As mentioned above the air pockets inhibit same, and this problem may be time sensitive in nature. Without gaps or air pockets heat may dissipate directly from cable, grout, conduit, grout, to earth. Filling the casing pipe with the thixotropic non-cementitious thermal grout has an electrical conductivity much greater than that of the surrounding earth and makes cathodically protecting the cable pipe more feasible than prior art pipe-within-a-pipe applications. Electrical resistivity of the thixotropic non-cementitious thermal grout (e.g. 325 Ohm-cm) is about twenty times lower than that of the native soil (e.g. 6925 Ohm-cm at 22% moisture content), i.e. electrical conductivity is twenty times greater. This makes it possible to cathodically protect the pipe inside the casing in several different manners (by bare casing with conventional impressed current system on the cable pipe; by bare casing used as anode; by coating the outside of the casing used as the anode; or by impressed current 'ribbon' anode). This may enable the added advantage of increasing amperage and, therefore, utilizing smaller cable (lighter weight) for pulls and maintenance, and/or less cable splicing may be required for longer distance pulls.

In one exemplary embodiment, a method of installing cables/conduits/ducts/product lines utilizes a thixotropic non-cementitious thermal grout comprising a volume of sand, a volume of water, a volume of bentonite viscosifier, a volume of at least one bentonite extender, a volume of lubricant, and a volume of soda ash.

In one exemplary embodiment, a method of installing cables/conduits/ducts/product lines utilizes a thixotropic non-cementitious thermal grout comprising a volume of frac sand at about 1629 lb/yd$^3$, a volume of water at about 982 lb/yd$^3$; a volume of bentonite viscosifier at about 43.5 lb/yd$^3$; a volume of at least one bentonite extender at about 10.3 lb/yd$^3$; a volume of lubricant at about 4.0 lb/yd$^3$; and a volume of soda ash at about 7.6 lb/yd$^3$.

In one exemplary embodiment, a method of installing cables/conduits/ducts/product lines may comprise the steps of agitating the thixotropic non-cementitious thermal grout to un-gel or unsolidify the thixotropic non-cementitious thermal grout and pulling the cable/conduit/duct/product line out through the grout.

In one exemplary embodiment, a method of installing cables/conduits/ducts/product lines may comprise the steps of surrounding the cable/conduit/duct/product line with the grout and inhibiting corrosion of metal, the grout having a pH in the range of about 11-12. Although an unexpected result to those skilled in the art (i.e. it is counterintuitive for a pH within the range of about 11-12 to be advantageous for inhibiting the corrosion of metal such as steel), the bentonite extender or DRILPLEX may be useful for same.

In one exemplary embodiment, a method of installing cables/conduits/ducts/product lines may comprise the step of surrounding the product line with the grout, the grout having a thermal resistivity of about equal to or less than 75° C.-cm/W.

In one exemplary embodiment, a method of installing cables/conduits/ducts/product lines may comprise the step of surrounding the product line with grout, the grout having an improved electrical conductivity or electrical resistivity of about 325 Ohm-cm.

In one exemplary embodiment, a method of installing cable/conduits/ducts/product lines may further comprise the step of the grout effluxing for fifteen seconds.

In one exemplary embodiment, a method of installing cables/conduits/ducts/product lines may further comprise the step of removing air pockets from the grout during the filling or surrounding step. By way of example only, the thixotropic non-cementitious thermal grout 10/110 could be pumped into the bottom or low point of void(s), holes or troughs to be filled, pushing the air out (i.e. toward high points). Vacuum pumps and stand pipes may be useful for same.

Working Example

In one working example referring to FIGS. 1 & 2 a ball valve or valves 22 may be connected to a conduit 14 or casing 12 to be filled with the thixotropic non-cementitious thermal grout 10. A frac tank 18 may be connected proximate the entrance and/or exit to supply the thixotropic non-cementitious thermal grout 10. Vacuum pump(s) 20 are also connected to the conduit 14 or casing 12 to be filled. Vacuum pump(s) 20 are turned on to pull, by way of example only, a vacuum pressure of −10 psi atmospheric pressure. Specific ball valve(s) 22 (or ball valve(s) in combination with rotating devices) may then be opened to allow the thixotropic non-cementitious thermal grout 10 to flow gravitationally (the grout 10 flows freely) into the conduit 14 or casing 12 utilizing the volume stored in the frac tank 18 until the conduit 14 or casing 12 is filled completely or as desired. Some of the vacuum pressure may be lost during this step or as the conduit 14 or casing 12 is filled. If needed the vacuum pump(s) 20 may be reactivated to pump remaining thixotropic non-cementitious thermal grout 10 as needed into the conduit 14 or casing 12 until filled. Next, connect the electric cable pulling head to a swivel connected to pulling rig and reel, and for installation pull the electric cable 16 into the thixotropic non-cementitious thermal grout 10 in conduit 14 or casing 12. Then, optionally or if ever to be maintained, the electric cable 16, conduits 14 and/or casing 12 may be removed.

It is to be understood that the teaching and disclosure of U.S. patent application Ser. No. 16/682,952, filed Nov. 13, 2019, and Published as U.S. 20200099202-A1; U.S. patent application Ser. No. 16/330,891, filed Mar. 6, 2019, and Published as US patent publication no. US 20190211628-A1; PCT Application No. PCT/US17/50219; and PCT Publication No. WO 2018/048861 all are incorporated by reference herein.

It is understood that the present disclosure is not limited to the particular applications and embodiments described and illustrated herein, but covers all such variations thereof as come within the scope of the claims. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The reference numbers in the claims are not intended to be limiting in any way nor to any specific embodiment represented in the drawings, but are included to assist the reader in reviewing the disclosure for purposes of a provisional filing.

The invention claimed is:

1. A thixotropic non-cementitious thermal grout for horizontal directional drilling (HDD) applications for use with a product line, comprising:
   a volume of sand;
   a volume of water;
   a volume of bentonite viscosifier;
   a volume of at least one bentonite extender;
   a volume of lubricant; and
   a volume of soda ash.

2. The thixotropic non-cementitious thermal grout according to claim 1, wherein:
said volume of sand is a frac sand at about 1629 lb/yd$^3$;
said volume of water is at about 982 lb/yd$^3$;
said volume of bentonite viscosifier is at about 43.5 lb/yd$^3$;
said volume of at least one bentonite extender is at about 10.3 lb/yd$^3$;
said volume of lubricant is at about 4.0 lb/yd$^3$; and
said volume of soda ash is at about 7.6 lb/yd$^3$.

3. The thixotropic non-cementitious thermal grout of claim 1, wherein the thixotropic non-cementitious thermal grout has a thermal resistivity value of about less than or equal to 75° C.-cm/W.

4. The thixotropic non-cementitious thermal grout of claim 3, wherein said thermal resistivity value ranges from 65° C.-cm/W to 75° C.-cm/W.

5. The thixotropic non-cementitious thermal grout of claim 1, wherein the thixotropic non-cementitious thermal grout has a pH value of at least about 11.

6. The thixotropic non-cementitious thermal grout of claim 1, wherein the thixotropic non-cementitious thermal grout has a pH value in the range of about 11-12.

7. The thixotropic non-cementitious thermal grout of claim 1, further comprising a second bentonite extender.

8. The thixotropic non-cementitious thermal grout of claim 7, wherein said second bentonite extender further comprises a mixed metal oxide.

9. The thixotropic non-cementitious thermal grout of claim 1, wherein said volume of sand is a flaked frac sand.

10. The thixotropic non-cementitious thermal grout of claim 1, wherein said volume of sand is a frac sand, #100 frac sand.

11. The thixotropic non-cementitious thermal grout of claim 1, wherein said volume of bentonite viscosifier comprises a 220-bbl yield Wyoming bentonite blended with extender.

12. The thixotropic non-cementitious thermal grout of claim 1, wherein said volume of the at least one bentonite extender comprises a mixed metal oxide.

13. The thixotropic non-cementitious thermal grout of claim 1, wherein said volume of lubricant is a rod lubricant.

14. The thixotropic non-cementitious thermal grout of claim 1, wherein the thixotropic non-cementitious thermal grout has a density value within the range of about 97 to 99 pounds per cubic foot and a specific gravity value of about 1.6.

15. A thixotropic non-cementitious thermal grout for trenching applications for use with a product line, comprising:
a volume of sand;
a volume of water;
a volume of bentonite viscosifier;
a volume of at least one bentonite extender;
a volume of lubricant; and
a volume of soda ash.

16. The thixotropic non-cementitious thermal grout according to claim 15, wherein:
said volume of sand is a frac sand at about 1629 lb/yd$^3$;
said volume of water is at about 982 lb/yd$^3$;
said volume of bentonite viscosifier is at about 43.5 lb/yd$^3$;
said volume of at least one bentonite extender is at about 10.3 lb/yd$^3$;
said volume of lubricant is at about 4.0 lb/yd$^3$; and
said volume of soda ash is at about 7.6 lb/yd$^3$.

17. The thixotropic non-cementitious thermal grout of claim 15, wherein the thixotropic non-cementitious thermal grout has a thermal resistivity value of about less than or equal to 75° C.-cm/W.

18. The thixotropic non-cementitious thermal grout of claim 17, wherein said thermal resistivity value ranges from 65° C.-cm/W to 75° C.-cm/W.

19. The thixotropic non-cementitious thermal grout of claim 15, wherein the thixotropic non-cementitious thermal grout has a pH value of at least about 11.

20. The thixotropic non-cementitious thermal grout of claim 15, wherein the thixotropic non-cementitious thermal grout has a pH value in the range of about 11-12.

21. The thixotropic non-cementitious thermal grout of claim 15, further comprising a second bentonite extender.

22. The thixotropic non-cementitious thermal grout of claim 21, wherein said second bentonite extender further comprises a mixed metal oxide.

23. The thixotropic non-cementitious thermal grout of claim 15, wherein said volume of sand is a flaked frac sand.

24. The thixotropic non-cementitious thermal grout of claim 15, wherein said volume of sand is a frac sand, #100 frac sand.

25. The thixotropic non-cementitious thermal grout of claim 15, wherein said volume of bentonite viscosifier comprises a 220-bbl yield Wyoming bentonite blended with extender.

26. The thixotropic non-cementitious thermal grout of claim 15, wherein said volume of the at least one bentonite extender comprises a mixed metal oxide.

27. The thixotropic non-cementitious thermal grout of claim 15, wherein said volume of lubricant is a root lubricant.

28. The thixotropic non-cementitious thermal grout of claim 15, wherein the thixotropic non-cementitious thermal grout has a density value within the range of about 97 to 99 pounds per cubic foot and a specific gravity value of about 1.6.

29. A method of installing a first product line in a horizontal directional drilling (HDD) or a trenching application, comprising the steps of:
filling void defined by a second product line or a trough with a thixotropic non-cementitious thermal grout to a greater than about 80% fill rate; and
installing said first product line through said thixotropic non-cementitious thermal grout,
wherein said thixotropic non-cementitious thermal grout comprises a volume of a frac sand at about 1629 lb/yd$^3$; a volume of water at about 982 lb/yd$^3$; a volume of bentonite viscosifier at about 43.5 lb/yd$^3$; a volume of at least one bentonite extender at about 10.3 lb/yd$^3$; a volume of lubricant at about 4.0 lb/yd$^3$; and a volume of soda ash at about 7.6 lb/yd$^3$.

30. A method of installing a first product line in a horizontal directional drilling (HDD) or a trenching application, comprising the steps of;
filling a void defined by a second product line or a trough with a thixotropic non-cementitious thermal grout to a greater than about 80% fill rate;
installing said first product line through said thixotropic non-cementitious thermal grout,
agitating said thixotropic non-cementitious thermal grout to un-gel said thixotropic non-cementitious thermal grout; and
pulling the said first product line out through said thixotropic non-cementitious thermal grout.

31. A method of installing a first product line in a horizontal directional drilling (HDD) or a trenching application, comprising the steps of:
- filling a void defined by a second product line pr a trough with a thixotropic non-cementitious thermal grout to a greater than about 80% fill rate;
- installing said first product line through said thixotropic non-cementitious thermal grout; and
- surrounding said first product line with said thixotropic non-cementitious thermal grout and inhibiting corrosion of metal, said thixotropic non-cementitious thermal grout having a pH value in the range of about 11-12.

32. A method of installing a first product line in a horizontal directional drilling (HDD) or a trenching application, comprising the steps of;
- filling a void defined by a second product line or a trough with a thixotropic non-cementitious thermal grout to a greater than about 80% fill rate;
- installing said first product line through said thixotropic non-cementitious thermal grout; and
- surrounding said first product line with said thixotropic non-cementitious thermal grout, said thixotropic non-cementitious thermal grout having a thermal resistivity value of about less than or equal to 75° C.-cm/W.

33. The method according to claim 32, further comprising the step of matching the thermal resistivity value of said thixotropic non-cementitious thermal grout to a thermal resistivity value of a native soil at a project site ranging from 65° C.-cm/W to 75° C.-cm/W.

34. A method of installing a first product line in a horizontal directional drilling (HDD) or a trenching application, comprising the steps of:
- filling a void defined by a second product line or a trough with a thixotropic non-cementitious thermal grout to a greater than about 80% fill rate;
- installing said first product line through said thixotropic non-cementitious thermal grout; and
- surrounding said first product line with said thixotropic non-cementitious thermal grout, said thixotropic non-cementitious thermal grout having an electrical resistivity value of about 325 Ohm-cm.

35. A method of installing a first product line in a horizontal directional drilling (HDD) or a trenching application, comprising the steps of:
- filling a void defined by a second product line or a trough with a thixotropic non-cementitious thermal grout to a greater than about 80% fill rate:
- installing said first product line through said thixotropic non-cementitious thermal grout; and
- further comprising the step of said thixotropic non-cementitious thermal grout effluxing for about fifteen seconds.

36. A method of installing a first product line in a horizontal directional drilling (HDD) or a trenching application, comprising the steps of:
- filling a void defined by a second product line or a trough with a thisotropic non-cementitious thermal grout to a greater than about 80% fill rate;
- removing air pockets from said thixotropic non-cementitious thermal grout during said filling step; and
- installing said first product line through said thixotropic non-cementitious thermal grout.

37. A method of installing a first product line in a horizontal directional drilling (HDD) or a trenching application, comprising the steps of:
- filling a void defined by a second product line or a trough with a thixotropic non-cementitious thermal grout to a greater than about 80% fill rate; and
- installing said first product line through said thixotropic non-cementitious thermal grout;
- wherein said step of filling the void with said thixotropic non-cementitious thermal grout occurs before said step of installing said first product line through said thixotropic non-cementitious thermal grout.

38. A method of installing a first product line in a horizontal directional drilling (HDD) or a trenching application, comprising the steps of;
- filling a void defined by a second product line or a trough with a thixotropic non-cementitious thermal grout to a greater than about 80% fill rate;
- installing said first product line through said thixotropic non-cementitious thermal grout; and
- surrounding said first product line with said thixotropic non-cementitious thermal grout, said thixotropic non-cementitious thermal grout has a density value within the range of about 97 to 99 pounds per cubic foot and a specific gravity value of about 1.6.

* * * * *